(12) United States Patent
Springer et al.

(10) Patent No.: US 11,492,246 B2
(45) Date of Patent: Nov. 8, 2022

(54) INGREDIENT DISPENSING IN A FLUID MIXTURE SYSTEM USING MONITORED PRESSURE

(71) Applicant: Cana Technology, Inc., Redwood City, CA (US)

(72) Inventors: Gregory Allen Springer, Los Altos, CA (US); Jeffery Lance Kizer, Oakland, CA (US); Matthew Ambauen, San Francisco, CA (US); Stephan Weidi Tai, San Francisco, CA (US); Erik James Shahoian, Sonoma, CA (US); David Friedberg, San Francisco, CA (US); Andrés Ornelas Vargas, San Francisco, CA (US); Simon Spence, Hawthorn (AU); Peter Delmenico, Hampton (AU); Andrew Christopher Jenkins, West Heidelberg (AU); Nathan Andrew Ray, Heathmont (AU); Kristopher Bernardo Dos Santos, San Francisco, CA (US)

(73) Assignee: Cana Technology, Inc., Redwood City, CA (US)

( * ) Notice: Subject to any disclaimer, the term of this patent is extended or adjusted under 35 U.S.C. 154(b) by 0 days.

(21) Appl. No.: 17/547,612

(22) Filed: Dec. 10, 2021

(65) Prior Publication Data
US 2022/0250895 A1    Aug. 11, 2022

Related U.S. Application Data

(60) Provisional application No. 63/146,461, filed on Feb. 5, 2021.

(51) Int. Cl.
*B67D 1/08* (2006.01)
*B67D 1/12* (2006.01)
(Continued)

(52) U.S. Cl.
CPC ......... *B67D 1/0884* (2013.01); *B67D 1/0885* (2013.01); *B67D 1/0888* (2013.01);
(Continued)

(58) Field of Classification Search
CPC .. B67D 1/0884; B67D 1/0885; B67D 1/0888; B67D 1/1252; B67D 1/14;
(Continued)

(56) References Cited

U.S. PATENT DOCUMENTS 4,921,135 A * 5/1990 Fleet .................... B67D 1/0869
222/105
5,240,144 A * 8/1993 Feldman .............. B67D 1/0462
222/105
(Continued)

FOREIGN PATENT DOCUMENTS

FR    2411318 A1    7/1979

OTHER PUBLICATIONS

International Search Report and Written Opinion dated Jul. 11, 2022 from International Application No. PCT/US2022/012028, 21 pages.
(Continued)

*Primary Examiner* — Frederick C Nicolas
(74) *Attorney, Agent, or Firm* — Daylight Law, P.C.

(57) ABSTRACT

Ingredient dispensing systems and methods in a fluid mixture system using a monitored chamber pressure are disclosed. One system includes a chamber, an inlet to the chamber, a set of ingredient reservoirs, in the chamber, storing a respective set of ingredients and sealed by a respective set of valve, a pressure source, and a controller. The system is programmed to set a pressure of the chamber using the pressure source and the inlet to the chamber. The system is also programmed to dispense, using the pressure,
(Continued)

at least two ingredients from the respective set of ingredients by actuating at least two valves from the respective set of valves.

32 Claims, 7 Drawing Sheets

(51) Int. Cl.
*B67D 1/14* (2006.01)
*B67D 1/00* (2006.01)
*B67D 1/04* (2006.01)

(52) U.S. Cl.
CPC .............. *B67D 1/1252* (2013.01); *B67D 1/14* (2013.01); *B67D 2001/0093* (2013.01); *B67D 2001/0098* (2013.01); *B67D 2001/0481* (2013.01); *B67D 2210/00089* (2013.01); *B67D 2210/00091* (2013.01)

(58) Field of Classification Search
CPC .... B67D 2001/0093; B67D 2001/0098; B67D 2001/0481; B67D 2210/00089; B67D 2210/00091
See application file for complete search history.

(56) References Cited

U.S. PATENT DOCUMENTS

| | | | |
|---|---|---|---|
| 5,251,787 A * | 10/1993 | Simson | B67D 1/0462 222/394 |
| 8,181,822 B2 | 5/2012 | Doelman et al. | |
| 9,242,845 B2 * | 1/2016 | Otto | B67D 1/0001 |
| 10,518,938 B2 | 12/2019 | Suzuki et al. | |
| 10,870,565 B2 * | 12/2020 | Otto | B67D 1/0001 |
| 2006/0138170 A1 | 6/2006 | Brim et al. | |
| 2013/0081443 A1* | 4/2013 | Rasmussen | B67D 1/0462 222/61 |
| 2014/0014687 A1* | 1/2014 | Cornwell | B65D 83/62 141/3 |
| 2014/0166694 A1 | 6/2014 | Otto | |
| 2017/0081168 A1 | 3/2017 | Seay et al. | |
| 2017/0225936 A1 | 8/2017 | Jersey et al. | |
| 2018/0327243 A1 | 11/2018 | Rider et al. | |

OTHER PUBLICATIONS

International Search Report dated May 17, 2022 from International Application No. PCT/US2022/012028 filed Jan. 11, 2022, 17 pages.

* cited by examiner

INGREDIENT DISPENSING IN A FLUID MIXTURE SYSTEM USING MONITORED PRESSURE

CROSS REFERENCE TO RELATED APPLICATIONS

This application claims the benefit of U.S. Provisional Patent Application No. 63/146,461 filed Feb. 5, 2021, which is incorporated by reference herein in its entirety for all purposes.

BACKGROUND

Typical beverage dispensing systems combine a diluent (e.g., water) with a basic beverage component such as concentrates or syrups made up of a multitude of other ingredients. However, these basic beverage components often require significant storage space and may even need to be kept refrigerated to protect against spoilage. Accordingly, these basic beverage components are most likely not even stored in the same room as the beverage dispensing system, much less in the beverage dispensing system itself. In addition, each individual beverage may require its own unique basic beverage component thereby further increasing storage space and the overall footprint of the beverage dispensing system. Furthermore, typical beverage dispensing systems cannot allow for customization of the beverage as well as household usage.

SUMMARY

This disclosure relates generally to fluid mixture dispensing systems, devices, and methods, and more specifically, to ingredient dispensing in a fluid mixture dispensing system using a monitored pressure.

Fluid mixture dispensing can be accomplished by an automated fluid mixture dispensing system. The system can generate mixtures of beverages, cleaning products, cosmetic compounds, and various other fluid mixtures. Based on a user selection that can be custom tailored, the system can prepare and dispense a variety of fluid mixtures, based on a set of basic mixtures and compounds. The system can rely on the predefined chemical makeup of the fluid mixture for the system to prepare the mixture. For example, chemical analysis of a specific wine or perfume results in a list of chemical ingredients or components that make up the specific wine or perfume. The systems disclosed herein can rely on that predetermined list of chemical ingredients for a specific final, user specified fluid mixture (e.g., chardonnay) to prepare that fluid mixture. Some chemical ingredients may be dispensed in the final mixture with relatively large volume percentages (e.g., a glass of wine may have about 10-15% ethanol), whereas other components may be dispensed in volume of less than 0.1 mL. Because a small quantity (e.g., less than 0.1 mL) of an individual chemical ingredient can have a large effect on a fluid mixture property (e.g., taste), the overall storage or footprint of the system can be significantly smaller than those dispensing system which rely on syrups and/or concentrates.

FIG. 1 illustrates an example of a fluid mixture dispensing system in the form of a device 100, in accordance with specific embodiments of the invention. Image 150 illustrates an example of the external appearance of the device 100 and image 160 illustrates an example of some of the internal components that can be part of the device 100. In some embodiments, the fluid mixture dispensing device 100 can be used for beverage dispensing as well as a wide variety of other fluid mixture dispensing. The fluid mixture dispensing device 100 can be a countertop or consumer electronic device or a larger device installed in a restaurant or other commercial business.

Fluid mixture dispensing device 100 can include a casing 102. The casing can be a protective outer casing that houses various internal components of the system, such as the components illustrated in image 160. These internal components can include solvent reservoir(s) (e.g., water reservoir(s) and/or alcohol reservoir(s)) such as solvent reservoirs 108a and 108b, ingredient reservoirs such as ingredient reservoirs 106, a cartridge for the ingredient reservoirs, such as cartridge 105, mixing channels, mixing chambers, heat exchangers (e.g., heaters/chillers), and/or dissolution chamber(s) as well as various fluid moving mechanisms (e.g., valves, actuators, pumps, etc.). Fluid mixture dispensing system 100 can also include a user interface 103 so that a user can operate the device. For example, a user can select a beverage to be made by device 100 via the user interface 103. Fluid mixture dispensing system 100 can also include one or more controllers configured to execute instructions to control the various components of the device and to cause the device to perform the functions described in this disclosure.

The internal components of the device 100 can also include a set of valves, such as valve 120, associated to the ingredient reservoirs 106. A set of ingredient reservoirs 106 have been removed over the exposed valves 120 in the left portion of view 160. The valves can be configured to seal the ingredient reservoirs 106, for example by sealing a dispense orifice of the ingredient reservoirs 106. In specific embodiments of the invention, the valves are actuated by the controller to unseal the orifices and therefore fluidly connect the ingredient reservoirs 106 in cartridge 105 to a mixing area of the device 100.

In specific embodiments of the invention, the ingredient reservoirs, such as ingredient reservoir 106, are located within a chamber. The chamber can comprise at least one inlet. Pressure can be provided to the chamber via the inlet so that the chamber is pressurized. The pressure in the chamber can contribute to the dispense of the ingredient in ingredient reservoir 106 when the valve that seals the ingredient reservoir, such as valve 120, is open. In specific embodiments of the invention, cartridge 105 comprises a set of ingredient reservoirs. The chamber can be a chamber of cartridge 105 and be a common chamber for the set of ingredient reservoirs. The at least one inlet can be an inlet of the cartridge's chamber so that that the ingredient reservoirs in the set of ingredient reservoirs are pressurized via the same inlet. Specific embodiments of the invention disclose mechanisms that use the pressure inside the chamber to determine a volume of ingredient dispensed from the ingredient reservoirs. Specific embodiments of the invention disclose uses of the volume determined based on the pressure in a fluid mixture dispensing system such as system 100.

In specific embodiments of the invention, a fluid mixture dispensing device is disclosed. The device comprises a chamber, an inlet to the chamber, a set of ingredient reservoirs, in the chamber, storing a respective set of ingredients and sealed by a respective set of valves, a pressure source, and a controller storing instructions that, when executed, cause the fluid mixture dispensing device to: set a pressure of the chamber using the pressure source and the inlet to the chamber; and dispense, using the pressure, at least two ingredients from the respective set of ingredients by actuating at least two valves from the respective set of valves.

In specific embodiments of the invention, a cartridge is provided. The cartridge comprises a chamber, an inlet to the chamber, and a set of ingredient reservoirs, in the chamber, storing a respective set of ingredients and having a respective set of orifices. The chamber is air-tight when the inlet and respective set of orifices are sealed.

In specific embodiments of the invention, a method is provided. The method comprises determining a first pressure in a chamber. The chamber includes at least one ingredient reservoir. The method also comprises, subsequent to the determining, dispensing at least one respective ingredient from the at least one ingredient reservoir, subsequent to the dispensing, determining a second pressure in the chamber, and determining a volume dispensed from the at least one ingredient reservoir using a difference between the first pressure and the second pressure.

BRIEF DESCRIPTION OF THE DRAWINGS

In the Figures, like reference numbers correspond to like components unless otherwise stated.

DETAILED DESCRIPTION

Figure 1:
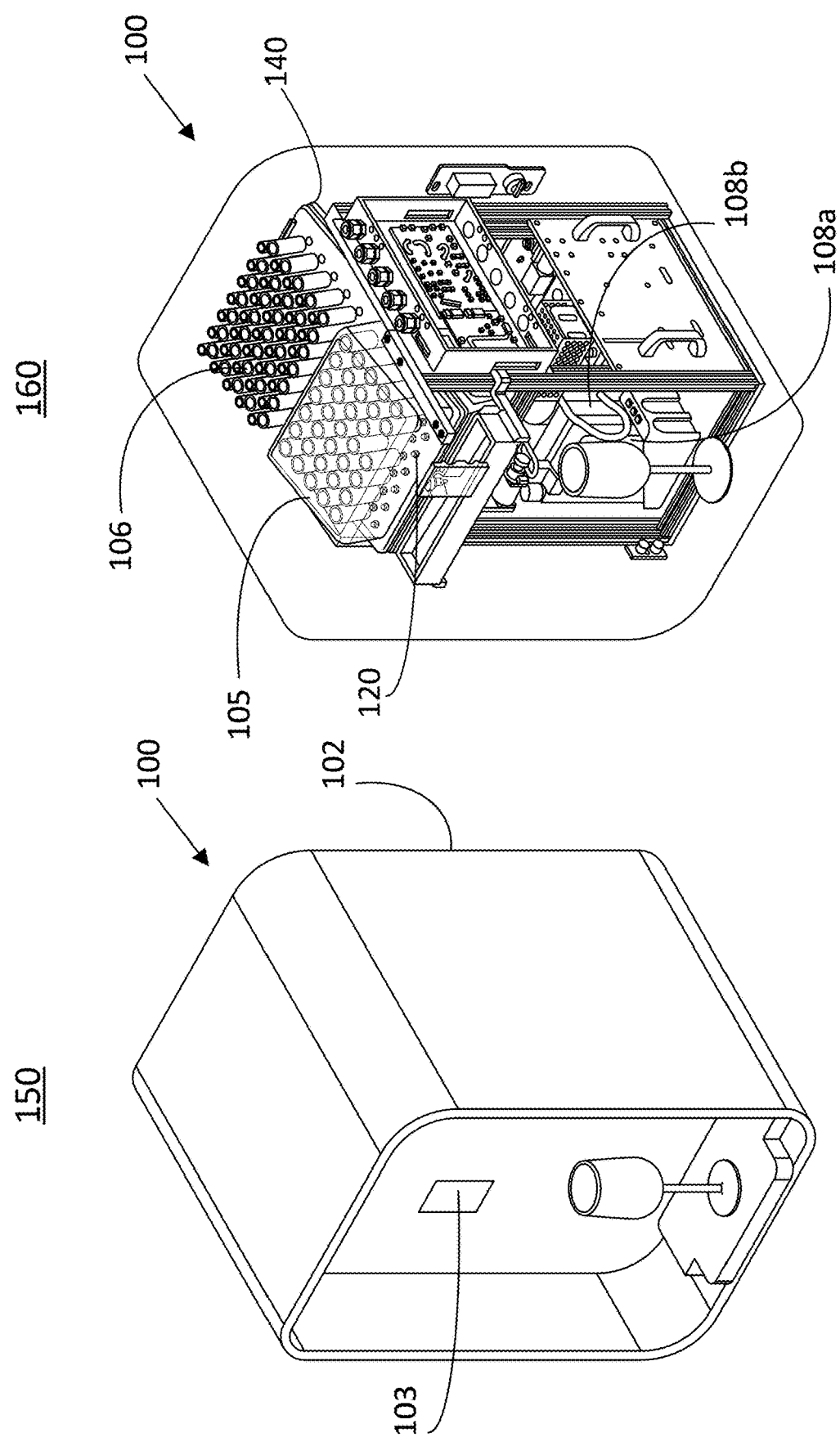
FIG. 1 illustrates an example of a fluid mixture dispensing system, in accordance with specific embodiments disclosed herein.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Different components and methods for a fluid mixture dispensing system such as device 100 illustrated in FIG. 1 will be described in detail in this disclosure. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

As illustrated with reference to FIG. 1, the fluid mixture dispensing device 100 can include one or more ingredient reservoirs, such as ingredient reservoir 106. The ingredient reservoirs can be any of the ingredient reservoirs described in U.S. Provisional Patent Application No. 63/146,461 filed Feb. 5, 2021, U.S. patent application Ser. No. 17/547,081 filed Dec. 9, 2021 and U.S. patent application Ser. No. 17/545,699 filed Dec. 8, 2021, all of which are incorporated by reference herein in their entirety for all purposes.

An ingredient reservoir can include an "ingredient" also referred to herein as an "ingredient mixture". An ingredient mixture can include at least one primary/functional ingredient. A primary/functional ingredient can be at least one of a solid, liquid, or a gas. An example of a primary/functional ingredient can be a chemical compound.

In some embodiments, the ingredient mixture can include various concentrations of chemical compounds. In some embodiments, an ingredient mixture can include at least one solvent. The at least one solvent can be any combination of solvents disclosed herein. For example, an ingredient mixture in an ingredient reservoir can be a mixture of citric acid (primary/functional ingredient) and water at a particular concentration. Another ingredient mixture can be a mixture of potassium sulfate (primary/functional ingredient), water, and ethanol. As discussed herein, these ingredients/ingredient mixtures can be dispensed into a fluid stream (which could be a mixture in itself of solvent (e.g., water and/or ethanol)) and combined together to form an intermediate fluid mixture. In some embodiments, an ingredient mixture can also include at least one of a solvent (e.g., water and/or an alcohol) and an additive ingredient. An additive ingredient can be at least one of a surfactant, preservative, or an emulsifier/stabilizer.

Ingredient or ingredient mixtures can be stored in ingredient reservoirs, such as ingredient reservoir 106. In some embodiments, the ingredient reservoirs can include bladder bags, syringes, gravity dispense chambers, pellet dispenser, and/or pierceable volumes. In some embodiments, the ingredient reservoirs can be the same, vary, or a combination thereof in the system. In some embodiments, the fluid mixture dispensing system can include a plurality of ingredient reservoirs. In these various embodiments, the ingredient reservoirs can be configured to be pressurized with the pressure on or in the reservoir contributing to a volume of ingredient which is dispensed from the reservoirs.

In some embodiments, in response to receiving a request for a fluid mixture, the system can flow a predetermined amount of at least one ingredient from a plurality of ingredient reservoirs to at least one mixing channel to form an intermediate fluid mixture. The device can include multiple mixing channels. The term mixing area will be used in this disclosure to refer to any area in which an intermediate fluid mixture is mixed including, for example one or more mixing channels in which one or more ingredients are mixed with one or more solvents. The predetermined amount of the at least one ingredient can be mixed with at least one solvent (e.g., water from a water reservoir and/or alcohol from an alcohol reservoir) in the at least one mixing channel before flowing to the mixing chamber. The at least one solvent can dissolve the at least one ingredient and/or carry the at least one ingredient to the mixing chamber.

In some embodiments, in response to receiving a request for a fluid mixture, the system can flow a predetermined amount of at least one ingredient from at least one ingredient reservoir to other parts of the system, such as a mixing chamber, or to at least one dissolution chamber to form an intermediate mixture. In some embodiments, the at least one ingredient reservoir that is configured to flow an ingredient directly to the mixing chamber and/or dissolution chambers may not be one of the ingredient reservoirs that is fluidly connected to the at least one mixing channel.

In some embodiments, the predetermined amounts of the ingredient(s) can be specific to the requested fluid mixture. In other words, the predetermined amounts of the ingredient(s) that is flowed to the mixing chamber whether it be flowed directly there or in an intermediate mixture or mixtures from a mixing area can correspond to the amount of the ingredient(s) in a predefined fluid mixture, for example a fluid mixture selected from a library of predefined fluid mixtures.

In some embodiments, a predetermined amount of an ingredient from an ingredient reservoir can be dispensed via at least one microfluidic pump into a mixing area including at least one mixing channel, or into the mixing chamber, and/or at least one dissolution chamber. In some embodiments, every ingredient reservoir can be fluidly connected to a microfluidic pump for dispensing an ingredient in an ingredient reservoir to a mixing channel, the mixing chamber, and/or at least one dissolution chamber. In some embodiments, multiple ingredient reservoirs can be fluidly connected to a microfluidic pump for dispensing ingredients from the ingredient reservoirs.

The ingredient reservoirs can be provided in one or more cartridges, such as cartridge 105. The cartridge can be any of the cartridges described in U.S. Provisional Patent Application No. 63/146,461 filed Feb. 5, 2021, U.S. patent application Ser. No. 17/547,081 filed Dec. 9, 2021 and U.S. patent application Ser. No. 17/545,699 filed Dec. 8, 2021, all of which are incorporated by reference herein in their entirety for all purposes.

FIG. 1 shows a set of ingredient reservoirs, such as ingredient reservoir 106, packaged in an ingredient cartridge 105. In some embodiments, the system can include one or more ingredient cartridges. For example, at least one of 0-N solid ingredient cartridges, 0-N gaseous ingredient cartridges, 0-N multi-ingredient cartridges, and 0-N liquid ingredient cartridges. In some embodiments, an ingredient cartridge 105 can include a plurality of ingredient reservoirs 106.

In some embodiments, at least one cartridge can be configured to dispense a predetermined amount of the at least one ingredient from at least one ingredient reservoir to a mixing area (including one or more mixing channels), the mixing chamber, and/or at least one dissolution chamber. In some embodiments, the at least one cartridge can be removably attached from the fluid mixture dispensing system so that it can be replaced, serviced (ingredients refilled/replaced) and recycled. In some embodiments, the fluid mixture dispensing system can still operate with a cartridge missing or empty.

In some embodiments, a predetermined amount of at least one ingredient can be dispensed via at least one valve, such as valve 120, into the mixing area, the mixing chamber, and/or at least one dissolution chamber. The valves, such as valve 120, can be electromechanical valves, and include an actuator. The actuators can be solenoids in which case the valves can be referred to as solenoid valves. The valves can be any of the valves disclosed in U.S. Provisional Patent Application No. 63/146,461, filed Feb. 5, 2021, and U.S. patent application Ser. No. 17/547,716 filed Dec. 10, 2021, both of which are incorporated by reference herein in their entirety for all purposes. In some embodiments, each ingredient reservoir can have an individual valve with an individual associated actuator. In some other embodiments, more than one ingredient reservoir can be associated to the same valve and/or actuator. In some embodiments, each valve can be configured to control the flow of an ingredient from an ingredient reservoir to the mixing area, the mixing chamber, and/or at least one dissolution chamber.

In some embodiments, the ingredients stored in the ingredient reservoirs (e.g., ingredient reservoir 106) can be ported to the valves (e.g., valve 120) beneath the ingredient reservoir. In some embodiments, the ingredient reservoirs (and their valves) can open to a mixing area. In some embodiments, a plurality of ingredient reservoirs can be fluidly connected to a mixing area including a single mixing channel. In some embodiments, a mixing channel can be fluidly connected to a plurality of mixing channels and a second mixing channel can be fluidly connected to a second plurality of mixing channels. For example, a first mixing channel may have 5-20 ingredient reservoirs fluidly connected to it and a second mixing channel may have 5-20 of the same or different ingredient reservoirs fluidly connected to the second mixing channel. In those embodiments, the mixing area can include the plurality of mixing channels. Accordingly, at least one solvent (e.g., water and/or ethanol) can flow through the mixing area and collect any ingredient dispensed into the mixing channels. In some embodiments, at least one solvent can also be dispensed into the mixing area to remove any leftover ingredients.

In some embodiments, the mixing channel(s) can be formed into the bottom of a plate, such as plate 140 in FIG. 1. All the mixing channels can be fluidly connected to the solvent reservoir(s) and the mixing chamber. As such, solvent can enter at least one mixing channel and at least one ingredient from at least one mixing reservoir can flow into the mixing channel to form an intermediate mixture with the solvent.

In specific embodiments of the invention, the solvents used can be water, alcohol, ethyl lactate, and/or propylene glycol. At least one solvent reservoir can supply at least one solvent to the fluid mixture to be dispensed. For example, at least one solvent reservoir 108*a* is shown in FIG. 1 and can be, for example, a water reservoir. In some embodiments, the fluid mixture dispensing system can include a plurality of solvent reservoirs (e.g., one or multiple water reservoirs, one or multiple alcohol reservoirs, one or multiple propylene glycol reservoirs, one or multiple ethyl lactate reservoirs, and/or mix of alcohol and water reservoirs, among other variations). In some embodiments, any water reservoir(s) can include a water filter such that the water filter can remove impurities from the water in the water reservoir(s) prior to flowing the water to the other parts of the system (e.g., mixing chamber).

The at least one solvent reservoir can supply solvent to the fluid mixture to be dispensed. For example, any water reservoir can supply water to the fluid mixture to be dispensed. In some embodiments, a solvent reservoir is a solvent container housed within the fluid mixture dispensing system to supply solvent(s) to the system. The solvent(s) can be used to dissolve or carry various other ingredients to form the requested fluid mixture. In some embodiments, in response to receiving the request for a fluid mixture, the system (e.g., a controller of the system) can flow a predetermined amount of at least one solvent from at least one solvent reservoir to at least one mixing channel to form an intermediate fluid mixture.

In some embodiments, a water reservoir is a water container housed within the fluid mixture dispensing system. In other embodiments, the water reservoir may be a standard water outlet such as a faucet or water line that can be connected to the fluid mixture dispensing system to supply water to the system. In addition, water can be used as a solvent to dissolve various other ingredients to form the requested fluid mixture. In some embodiments, in response to receiving the request for a fluid mixture, the system (e.g., a controller of the system) can flow a predetermined amount of water from a water reservoir to at least one mixing channel to form an intermediate fluid mixture. The predetermined amount of water can be mixed with alcohol from an alcohol reservoir and/or ingredients (i.e., ingredient mixtures) from a plurality of ingredient reservoirs in the at least one mixing channel to form an intermediate mixture before flowing to the mixing chamber.

In specific embodiments of the invention, the system can flow a predetermined amount of at least one solvent from at least one solvent reservoir to other parts of the system such as the mixing chamber. As such, the mixing chamber can be fluidly connected to a water reservoir.

The predetermined amount of the at least one solvent can be specific to the requested fluid mixture. In other words, the predetermined amounts of solvent(s) that is flowed to the mixing chamber whether it/they be directly flowed there or in an intermediate mixture or intermediate mixtures can correspond to the amount of solvent(s) in the predefined fluid mixture selected from the library of predefined fluid mixtures. In some embodiments, the predetermined amounts of the at least one solvent can be flowed from the at least one solvent reservoir throughout the system via at least one pump.

In some embodiments, the fluid mixture dispensing system can include more than one solvent reservoir, for example a second solvent reservoir such as second solvent reservoir 108b illustrated in FIG. 1. The second solvent reservoir can be for the same or different solvent as the first solvent reservoir. In specific embodiments of the invention, the second solvent reservoir, such as 108b, can be an alcohol reservoir. In some embodiments, the fluid mixture dispensing system can include a plurality of alcohol reservoirs. The alcohol reservoir can supply alcohol to the fluid mixture to be dispensed. As stated above, the solvent reservoirs can include alcohol (e.g., ethanol), water, ethyl lactate, propylene glycol, and/or a wide variety of other alcohols and/or solvents and their various combinations. Alcohol in the alcohol reservoir can be an alcohol mixture. In some embodiments, the alcohol mixture can include the alcohol and water. For example, an alcohol can be an alcohol mixture of 10-100% alcohol by volume (0-90% water by volume).

In some embodiments, an alcohol reservoir(s) is an alcohol container(s) housed within the fluid mixture dispensing system. Besides supplying the alcohol to a fluid mixture, alcohol can also be used to dissolve various other ingredients to form an intermediate fluid mixture as part of the requested fluid mixture. Alcohol can also be used as a sanitizing agent for the system.

In some embodiments, in response to receiving the request for a fluid mixture, the system (e.g., a controller of the system) can flow a predetermined amount of alcohol from an alcohol reservoir to at least one mixing channel to form an intermediate fluid mixture. The predetermined amount of alcohol can be mixed with water from a water reservoir and/or ingredients form a plurality of ingredient reservoirs in the at least one mixing channel to form an intermediate mixture before flowing to the mixing chamber. In some embodiments, the water and alcohol can be mixed prior to entering the at least one mixing channel.

In some embodiments, in response to receiving a request for a fluid mixture, the system can flow a predetermined amount of alcohol from an alcohol reservoir to other parts of the system such as the mixing chamber and/or a dissolution chamber. As such, the mixing chamber can be fluidly connected to an alcohol reservoir and the alcohol reservoir can be fluidly connected to the at least one dissolution chamber which in turn can be fluidly connected to the mixing chamber.

The predetermined amounts of alcohol can be specific to the requested fluid mixture. In other words, the predetermined amounts of alcohol that is flowed to the mixing chamber whether it be directly flowed there or in an intermediate mixture or mixtures can correspond to the amount of alcohol in the predefined fluid mixture selected from the library of predefined fluid mixtures. For example, if a glass of Chardonnay is selected and the predefined formula for Chardonnay has 14% alcohol by volume, the system would flow predetermined amounts of ethanol to the mixing chamber to be incorporated such that the Chardonnay has 14% alcohol by volume in the final dispensed fluid mixture based on the volume of the other ingredients. In some embodiments, the predetermined amounts of alcohol can be flowed from an alcohol reservoir throughout the system via at least one pump. In some embodiments, the system (e.g., the controller) can be configured to monitor an amount of alcohol or other solvent and/or ingredients in an alcohol, solvent and/or ingredient reservoir.

Figure 2:
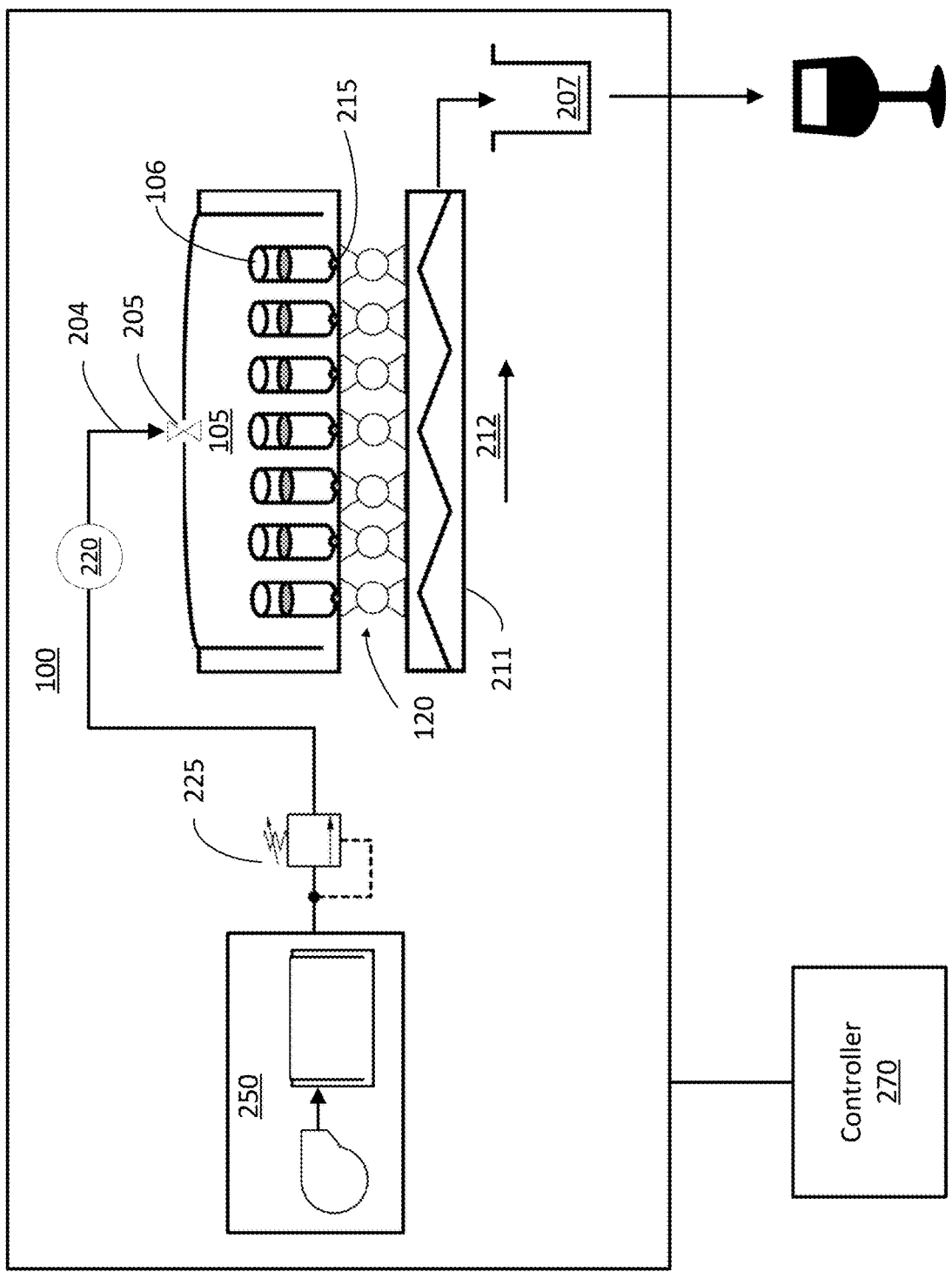
FIG. 2 illustrates a block diagram including exemplary components of the fluid mixture dispensing device in accordance with specific embodiments disclosed herein.

FIG. 2 illustrates a block diagram including exemplary components of the fluid mixture dispensing device in accordance with specific embodiments disclosed herein. Some components of the systems, such as the solvent reservoirs 108a/b, have been omitted for clarity, but the components disclosed with reference to any of the embodiments of the invention could be part of this diagram as well. FIG. 2 includes a schematic representation of the cartridge 105 including a set of ingredient reservoirs, such as ingredient reservoir 106. FIG. 2 also includes a representation of a set of valves, such as valve 120, that can fluidly connect, when actuated, the ingredient reservoirs 106 to a mixing area 211. The mixing area 211 can be an area where an intermediate mixture of one or more ingredients and/or one or more solvents is formed. The intermediate mixture can be moved from the mixing area 211 to a mixing chamber 207 to be further mixed with additional ingredients and/or be dispensed out of the device 100.

In specific embodiments of the invention and as illustrated in FIG. 2, each ingredient reservoir can include an orifice 215. The orifices, such as orifice 215, can be sealed by the valves, such as valve 120. An actuator of the valve 120 can be positioned in a "closed" state or position (sealing the orifices), in which no ingredient can flow from the ingredient reservoir 106 to the mixing channel 211. The actuator of the valve 120 can alternatively be positioned in an "open" state or position (unsealing the orifices), in which an ingredient can flow from the ingredient reservoir 106 to the mixing channel 211. A controller, such as controller 270, can be programmed to actuate the valves and switch their state accordingly.

In specific embodiments of the invention, the diameters of the orifices, such as orifice 215, can range from about 0.01-5 mm or about 0.05-1 mm depending on various factors, such as the physical flow characteristics of the ingredient stored in the particular ingredient reservoir. In specific embodiments of the invention, the diameter of the orifice can impact the flow rate through it for a given ingredient physical flow characteristic and other factors, such as a pressure, as will be explained below in more detail.

In specific embodiments of the invention, the ingredient reservoirs, such as ingredient reservoir 106 can be pressurized. The ingredient reservoirs can be pressurized by a pneumatic system such as pneumatic system 250. The pneumatic system can be any of the pneumatic systems disclosed in U.S. Provisional Patent Application No. 63/146,461 filed Feb. 5, 2021, and U.S. patent application Ser. No. 17/548,258 filed Dec. 10, 2021, both of which are incorporated by reference herein in their entirety for all purposes. The pneumatic system can pressurize the ingredient reservoirs via an inlet of the ingredient reservoir, such as a gas inlet. In specific embodiments of the invention, the ingredient reservoir can include a valve for such gas inlet (e.g., valve 205 for gas inlet 204) and the valve can alternatively seal the gas inlet or let the gas enter the reservoir. In specific embodiments of the invention, the ingredient reservoir can be air-tight when the gas inlet and the orifices 215 are sealed, for example by the respective valves 120.

The pressure inside the ingredient reservoir 106 can contribute to the dispense of the ingredient from the ingredient reservoir when the valve 120 that seals the respective ingredient reservoir is open. The pressure in the ingredient reservoir can force the ingredient out of the ingredient reservoir through the orifice 215 when the valve is open. Dispense mechanisms that use pressure to facilitate dispense from the ingredient reservoirs will be referred in this disclosure as pressure-based dispense mechanisms.

The pressure-based dispense can be advantageous in various situations. For example, if the ingredient reservoirs are placed so that when the valves are open the flow is generally normal to the Earth's surface, gravity could cause the ingredients to flow from the ingredient reservoirs to the mixing area. However, the physical characteristics of the ingredients, such as viscosity, can make this dispense mechanism hard to implement. Furthermore, other concerns such as limiting the position of the ingredient reservoirs inside the device, and/or minimizing dispense time can make the mechanisms less attractive. The pressure-based dispense in accordance with specific embodiments of the invention can be used alone or in combination with the gravity-based approaches mentioned above. As another example, if the ingredient reservoirs are placed so that when the valves are open the flow is generally parallel to the Earth's surface, the pressure-based dispense can be used to force the ingredients out of the ingredient reservoirs when the valves are open. Multiple other configurations can benefit from a pressure-based dispense method. In the example of FIG. 2, for example, the ingredient reservoirs are perpendicular to a flow 212 in the mixing area 211. The flow 212 can be for example a flow of solvent that is held in the mixing area 211 during dispense of ingredient from the ingredient reservoirs. In this example, ingredients may not naturally flow from the ingredient reservoirs 106 even though the ingredient flow is generally normal to the Earth's surface, since the flow 212 may stop them from entering the mixing area 211. In this example, the pressure-based dispense can be used to cause the ingredients to flow from the ingredient reservoirs and into the mixing area 211 and overcome any pressure associated with flow 212.

In specific embodiments of the invention, at least one cartridge with a set of ingredient reservoirs, such as cartridge 105, can include a pressurized chamber inside the cartridge to keep the ingredient reservoirs under pressure and facilitate dispense of such ingredients. In specific embodiments, the pressurized chamber can be formed by the cartridge itself, for example by a casing of the cartridge. This pressurized chamber can house a plurality of ingredient reservoirs, such as ingredient reservoir 106, such that a pressure for a single pressurized chamber can be applied to all the ingredient reservoirs within the chamber. In these embodiments, the plurality of ingredient reservoirs can be commonly pressurized.

The cartridge 105 can include an inlet, such as gas inlet 204 represented in FIG. 2. The gas inlet can include a gas inlet valve 205 to allow/block the flow of gas to/from the cartridge 105. In specific embodiments of the invention, the gas inlet 204 allows air from the pneumatic system 250 to enter the cartridge 105 to pressurize the pressurized chamber. In specific embodiments of the invention, the gas inlet valve 205 is a one-way valve. In specific embodiments of the invention, the gas inlet valve 205 is an electronically actuated valve that can be used to control pressure in the chamber. In specific embodiments of the invention, the gas inlet 204 is a common gas inlet for the plurality of ingredient reservoirs in the pressurized chamber. In this case, the pressurized chamber and/or cartridge can be sealed by closing the gas inlet 204 (for example via the gas inlet valve 205) and closing the set of orifices of the ingredient reservoirs (e.g., 215), for example via the valves such as valve 120. In specific embodiments of the invention, the chamber and/or cartridge is air-tight when the gas inlet 204 and the set of orifices 215 are sealed.

In specific embodiments of the invention, the system 100 can include one or more sensors, such as sensor 220. Sensor 220 can be a pressure sensor to measure the pressure in different points of the system, such as inside the pressurized chamber. In specific embodiments of the invention, the sensor is within the pressurized chamber, or is otherwise located so that it can measure the pressure in the pressurized chamber in cartridge 105. For example, the pressure sensor could be on the opposite side of a one-way valve that is meant to seal air from leaving the chamber. In specific embodiments of the invention, the pressure sensor can be in a channel from the pneumatic system to the pressurized chamber, to measure the pressure in the channel. The sensor measurements can be used for various purposes. For example, the one or more sensors 220 can be used to control the pressure inside the chamber so that the pressure is maintained within acceptable levels. For example, the controller 270 could use the measurements from sensor 220 to detect when the pressure in the chamber has dropped to a minimum value and then actuate the gas inlet valve 205 to allow air to enter and re-pressurize the chamber. As another example, the controller could use the measurements from sensor 220 to determine pressure variations within the chamber and for example calculate a volume dispensed therefrom. These and other uses of the pressure measurements will be disclosed in more detail in this disclosure. Other type of sensors can also be included in the system in specific embodiments of the invention. For example, sensor 220 could be a flow sensor and be configured to measure a flow through the channel where it is installed, for example an air flow from the pneumatic system to the cartridge when the cartridge is being pressurized.

The pressure within the chamber can be set via the inlet valve 205 and regulated, for example, via sensors such as sensor 220 and one or more pressure regulators, such as pressure regulator 225. Pressure regulator 225 can be part of, or associated to, the pneumatic system 250, and can regulate the pressure provided from the pneumatic system to other parts of the system, such as to cartridge 105. In specific embodiments, the pressure regulator will only admit air from pneumatic system 250 up until the point at which the cartridge side of the pressure regulator hits a desired pressure.

In some embodiments, the system can be configured to control the pressure of the pressurized chamber. Accordingly, the cartridge can be pressurized such that when the valve of an ingredient reservoir is opened (e.g., valve 120 for ingredient reservoir 106), the ingredient stored in that ingredient reservoir can flow out of the ingredient reservoir towards a mixing channel, the mixing chamber, and/or at least one dissolution chamber. The ingredient reservoirs can be loaded into or attached to the pressurized chamber with a controlled pressure for providing an expulsion force.

The mixing area (including one or more mixing channels), the mixing chamber, and/or at least one dissolution chamber can be fluidly connected to the valve outputs of the ingredient reservoirs such that any valve opening can result in an ingredient flowing to a mixing area (including one or more mixing channels), the mixing chamber, and/or at least one dissolution chamber. In some embodiments, the controller can be configured to open at least one valve for a time based on at least the pressure of the pressurized chamber, the physical flow characteristics of the specific ingredient in the ingredient reservoir, and/or the diameter of the at least one valve opening to control the flow of the predetermined amount of the at least one ingredient to be dispensed. Accordingly, for a specific ingredient in an ingredient reservoir, the system can be calibrated to dispense/flow a predetermined amount of the specific ingredient to a mixing area (including one or more mixing channels), the mixing chamber, and/or at least one dissolution chamber based on the pressure of the pressurized chamber, the physical flow characteristics (e.g., viscosity) of the specific ingredient in the ingredient reservoir, and/or the diameter of the valve opening (or diameter of orifice as explained below). As such, the time interval that the at least one valve is open can proportionally correspond to amounts/concentrations of at least one ingredient of a list of ingredients of a predefined fluid mixture (from a chemical analysis). Dispensing an expected amount of an ingredient, as controlled by the time the valve is open, using the approaches disclosed in this paragraph is referred to in this disclosure as a time-based ingredient dispensing method.

Figure 3A:
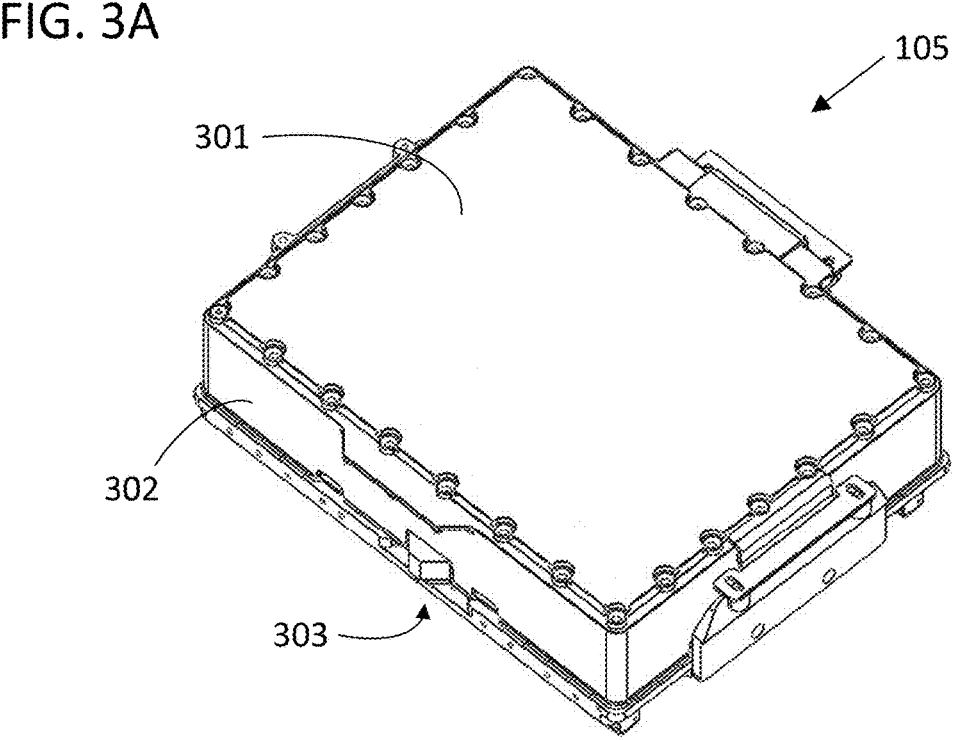
FIG. 3A illustrates an ingredient cartridge for the fluid mixture dispensing system, in accordance with specific embodiments disclosed herein.

FIG. 3A illustrates an example of an ingredient cartridge, such as cartridge 105, for the fluid mixture dispensing system, in accordance with specific embodiments disclosed herein. The cartridge can include a casing for housing the ingredient reservoirs. The casing can be formed by a top surface 301 (which can be a removable surface, such as a lid, for example for refilling the ingredient reservoirs), lateral walls 302, and a bottom surface 303 (which can include an interface for a device such as device 100).

Figure 3B:
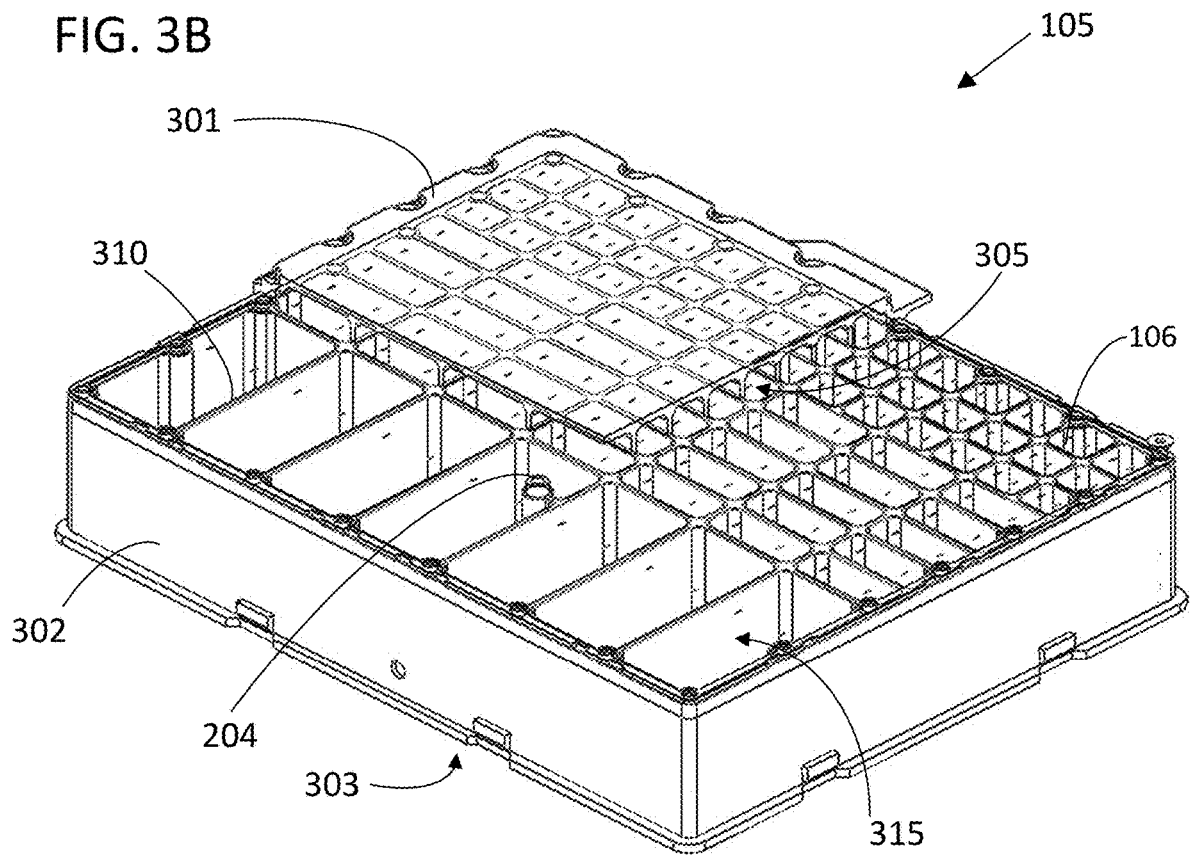
FIG. 3B illustrates the ingredient cartridge of FIG. 3A, with a portion of the top surface removed, in accordance with specific embodiments disclosed herein.

FIG. 3B illustrates the ingredient cartridge of FIG. 3A, with a portion of the top surface 301 removed, in accordance with specific embodiments disclosed herein. As explained before in this disclosure, the cartridge can comprise multiple ingredient reservoirs such as ingredient reservoir 106. As illustrated in the example of FIG. 3B, the ingredient reservoirs can have various sizes and shapes as determined by a device manufacturer. The sizes and shape can depend on the type of ingredient to be stored in the given reservoir.

FIG. 3B also illustrates a gas inlet 204. As explained, gas inlet 204 can allow gas, for example air form the pneumatic system, to enter a pressurized chamber in cartridge 105. The pressurized chamber can be the chamber indicated by reference number 305 in FIG. 3B inside the cartridge. In this example, the chamber is formed by the casing of the cartridge. As illustrated in the example of FIG. 3B, the ingredient reservoirs can include walls such as wall 310 to keep the ingredients in the ingredient reservoirs separate. As also lustrated in the example of FIG. 3B, the top of the ingredient reservoirs can be open to the chamber 305 so that the ingredients in the ingredient reservoir are exposed to the chamber in common.

The ingredient reservoirs, such as ingredient reservoir 106, can include different ingredients, including liquids such as concentrated liquids. In specific embodiments of the invention, the walls of the ingredient reservoirs, such as wall 310, can prevent the ingredients form mixing with each other when the cartridge is resting on its bottom surface 303. However, the cartridge can be moved from this rest position for multiple reasons, for example if the device 100 is relocated or if the cartridge is replaced. In specific embodiments of the invention in which the ingredient reservoirs are exposed to a common chamber, as illustrated in FIG. 3B, when the cartridge is moved the ingredients can move and spill out of their respective reservoirs. This could happen while handling the device/cartridge, during shipment, during installation, relocation, etc. Therefore, in specific embodiments of the invention where various ingredient reservoirs are open to a common pressurized chamber 305, it may be advantageous to provide the cartridge with a structure that prevents the ingredients from mixing with each other inside the common chamber, while still allowing the various ingredient reservoirs to be pressurized via the same gas inlet 204 and the same pressurized chamber 305.

In specific embodiments of the invention, a structure that prevents the ingredients in a cartridge from mixing, while still allowing the various ingredients to be pressurized via the same gas inlet, can be a cartridge membrane. The cartridge membrane can be placed on a top 315 of the ingredient reservoirs 106 (for example adhered to the top edges of the ingredient reservoirs walls 310), between the ingredient reservoirs and the top surface 301 of the cartridge 105/chamber 305. In specific embodiments of the invention, the cartridge membrane can be a membrane which is impermeable to liquids so that the liquid ingredients cannot pass through it. In specific embodiments of the invention, the cartridge membrane can be permeable to gas so that gas from the pressurized chamber can enter the individual ingredient reservoirs. In this way, the ingredient reservoirs can be pressurized within the same pressurized chamber, using the same pressure source and via the same gas inlet, while keeping the ingredients separate.

In specific embodiments of the invention, an inert gas can be provided to the pressurized chamber. For example, a layer of an inert gas can be initially inserted through gas inlet 204, before the chamber is fully pressurized through the addition of air. This can contribute to isolating the ingredients in the common pressurized chamber because any aerosolized ingredients can be prevented from mixing. In specific embodiments of the invention, the inert gas is Argon. In alternative embodiments of the invention, the inert gas is nitrogen.

Figure 4:
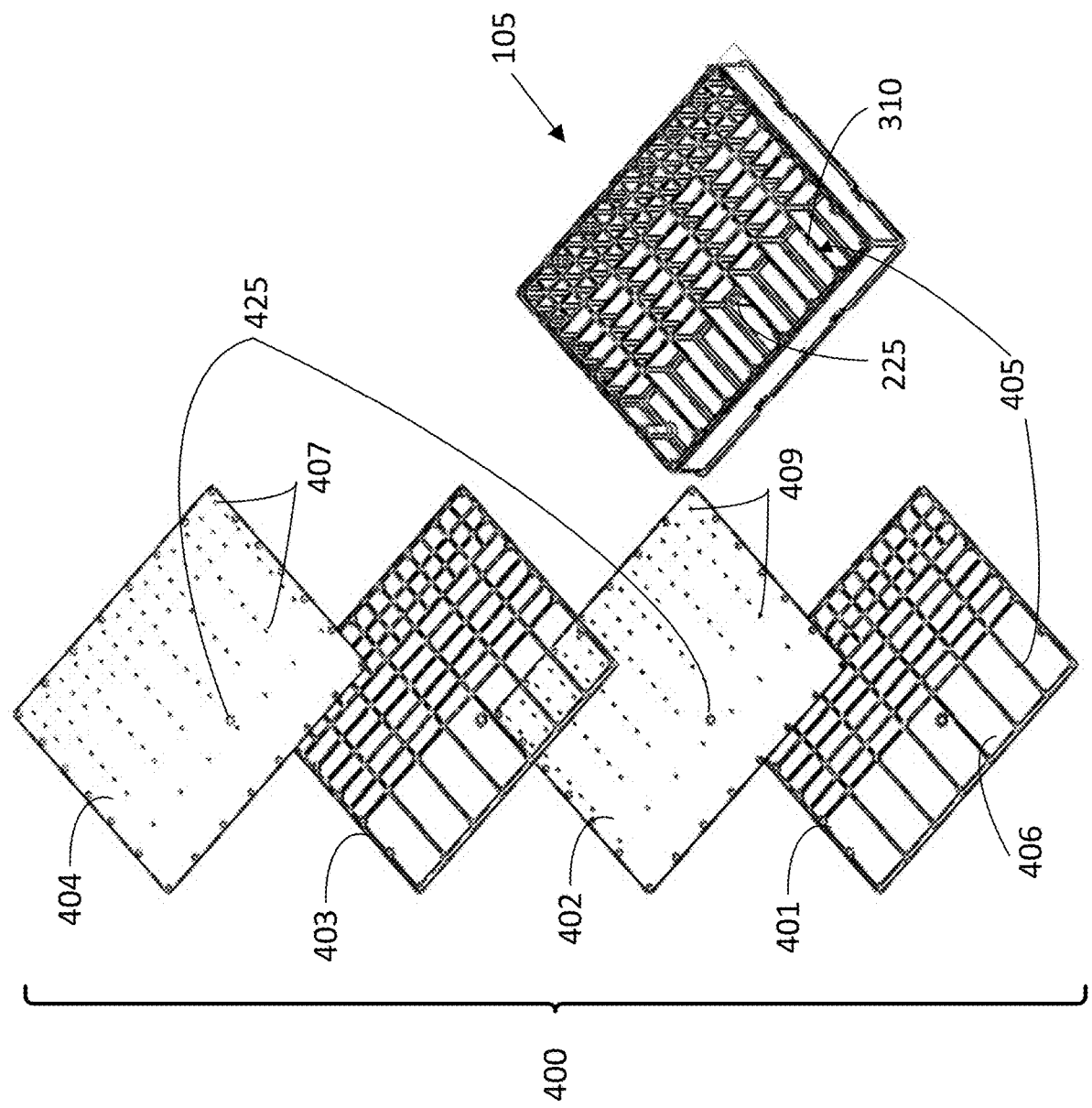
FIG. 4 illustrates an exploded view of a cartridge membrane for an ingredient cartridge, in accordance with specific embodiments disclosed herein.

FIG. 4 illustrates an exploded view of a specific implementation of a cartridge membrane 400 for the ingredient cartridge, in accordance with specific embodiments disclosed herein. The membrane can be attached to the top of the ingredient reservoirs via an adhesive layer 401. In specific embodiments of the invention, the adhesive can be a double-sided adhesive so that it adheres to the ingredient reservoirs on one side and to the membrane on the other side. In specific embodiments of the invention, the adhesive can be a pressure sensitive adhesive. The pressure sensitive adhesive can be cut from sheets to a desired pattern.

The adhesive layer 401 can include adhesive portions 405 and cut-outs 406. In specific embodiments of the invention, the adhesive portions 405 can follow the distribution of the walls of the ingredient reservoirs inside the cartridge, so that the adhesive portions can be adhered to the edges of the ingredient reservoir's walls 310, as indicated by the arrows that connects adhesive portion 405 to wall 310. In specific embodiments of the invention, the cut-outs 406 can match the open top of the ingredient reservoirs, so that the adhesive does not interfere with the gas entering the ingredient reservoirs.

The membrane 400 can include various layers, such as layers 402 and 404. Each layer of the membrane can be adhered to each other by an adhesive layer, such as adhesive layer 403. Adhesive layer 403 can be the same as or similar to adhesive layer 401. In specific embodiment of the invention, the membrane layers comprise a material in the form of a chemically resistant thermoelastomer such as, but not limited to, polyurethane, silicon, thermoplastic polyurethane (TPU), etc. In specific embodiments of the invention, the thickness of each membrane layer in the membrane is in a range of 0.05-0.35 mm. Each membrane layer is not necessarily the same thickness. In specific embodiments of the invention, the thickness of the membrane 400 overall is in a range of 0.12-1 mm.

In specific embodiments of the invention, the membrane layers, such as layers 402 and 404, can include slits, such as slits 407 and 409. As illustrated, the slits on each layer of membrane can be misaligned with the slits in the other layers of the membrane. For example, the position of slits 409 in layer 402 do not correspond with the position of slits 407 in layer 404. The slits can allow gas to pass through and therefore allow pressurization of the various ingredient reservoirs underneath the membrane from a common pressurized chamber. At the same time, the misalignment of the slits can prevent the liquid from flowing to other ingredient reservoirs in the chamber. In this way, the membrane 400 can be permeable to gas through the slits 409 and 407, and impermeable to ingredients such as liquids and solids.

Regardless of the type of cartridge membrane or other structure used in the cartridge to prevent the ingredients from mixing with each other, specific embodiments of the invention provide significant advantages in that a set of ingredient reservoirs configured to dispense ingredients individually (via a respective set of orifices and valves) can be pressurized from a common pressured chamber. This can be particularly advantageous for embodiments that include a cartridge with a large number of ingredient reservoirs (for example 80 ingredient reservoirs) because resources can be optimized in the system. For example, pressurizing each ingredient reservoir individually could involve providing an individual inlet valve to each cartridge, along with a pressure path from the pneumatic system to the respective reservoir, and individual pressure regulators and pressure sensors to set the pressure required for each specific reservoir. This could significantly impact not only the complexity of the system but also the costs. Specific embodiments of the invention that provide a common pressurized chamber for a set of ingredient reservoirs can in turn include a single pressure channel from the pneumatic system to the chamber, a single gas inlet, and only one regulator and pressure sensor could serve to set the pressure for all the ingredient reservoirs at once. Furthermore, because the pressurized volume is common to all reservoirs, such volume and pressure can be used for calculations in the system, such as dispensed volume, as will be described below in more detail.

Figure 5:
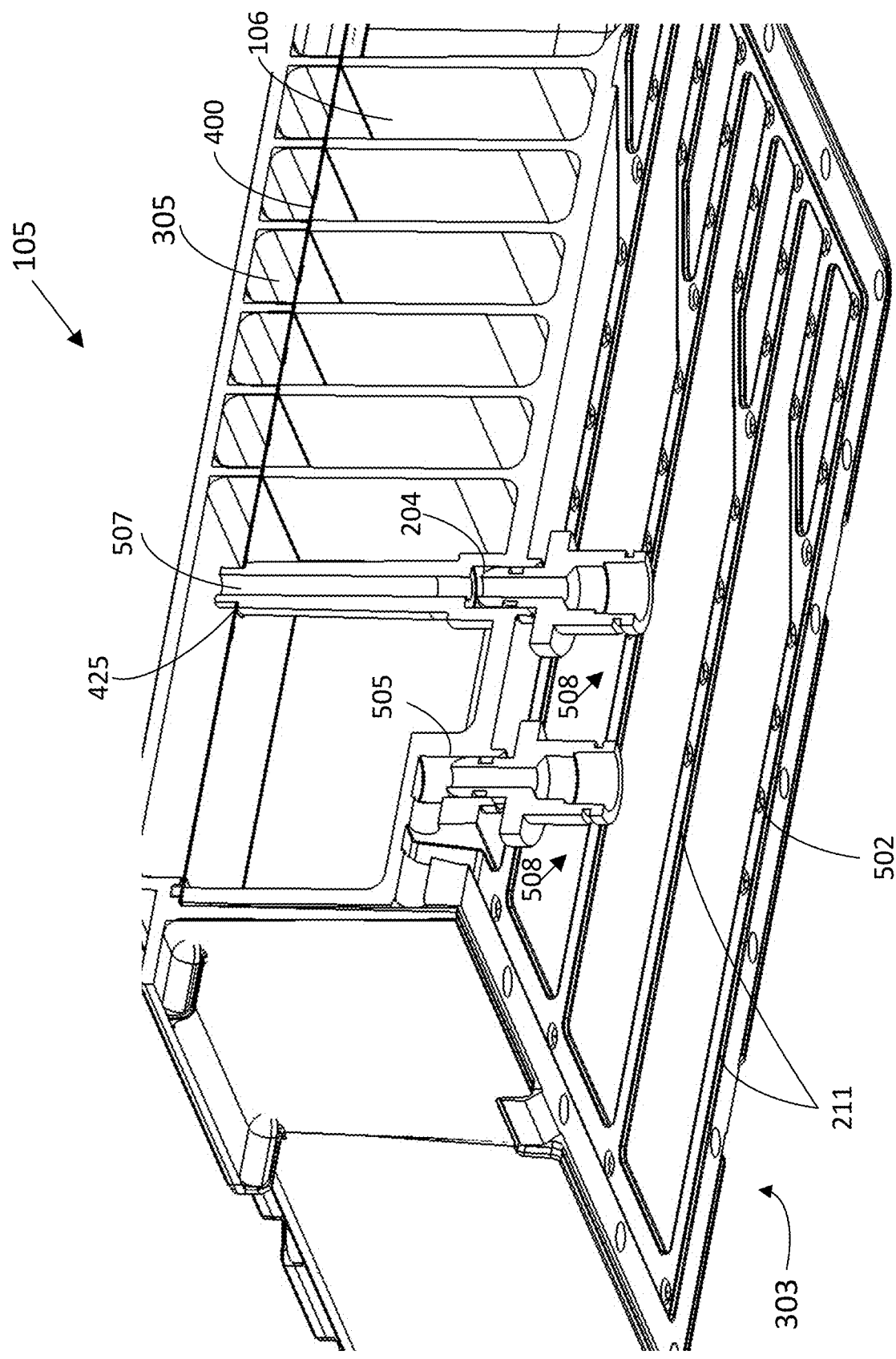
FIG. 5 illustrates a sectional view of the interior of the ingredient cartridge for the fluid mixture dispensing system, in accordance with specific embodiments disclosed herein.

As previously explained, the ingredients in a cartridge can be pressurized via the gas inlet 204. FIG. 5 illustrates a sectional view of the interior of the ingredient cartridge 105 for the fluid mixture dispensing system, in accordance with specific embodiments disclosed herein. In this view, the gas inlet 204 is illustrated inside the cartridge 105. As illustrated, a tube 507 of the gas inlet 204 extends from the bottom 303 of the cartridge through the cartridge membrane 400 and up to the top of the chamber 305. The membrane 400 can have an orifice 425 for the gas inlet tube, as also illustrated in the exploded view of FIG. 4. In this way, when the cartridge is installed in the device 100, the pneumatic system of the device can pressurize the cartridge's chamber 305. It should be noted that, although the chamber 305 is being represented on top of the membrane 400 for clarity, in specific embodiments of the invention the commonly pressurized "chamber" encompasses the volume of the whole pressurized space, including the ingredient reservoirs.

FIG. 5 also illustrates a plurality of channels, that can form the mixing area 211. The channels include holes such as hole 502 that can match (or can be) the orifices of the ingredient reservoirs so that when the orifices are open the ingredients can be dispensed to the channels through the holes. The valves, such as valve 120, can have an actuator that presses against through those holes and seal the orifices of the ingredient reservoirs. FIG. 5 also illustrates other components of the interface, such as a fluid inlet 505 via which fluid can enter the cartridge to be routed to the mixing area 211.

Figure 6:
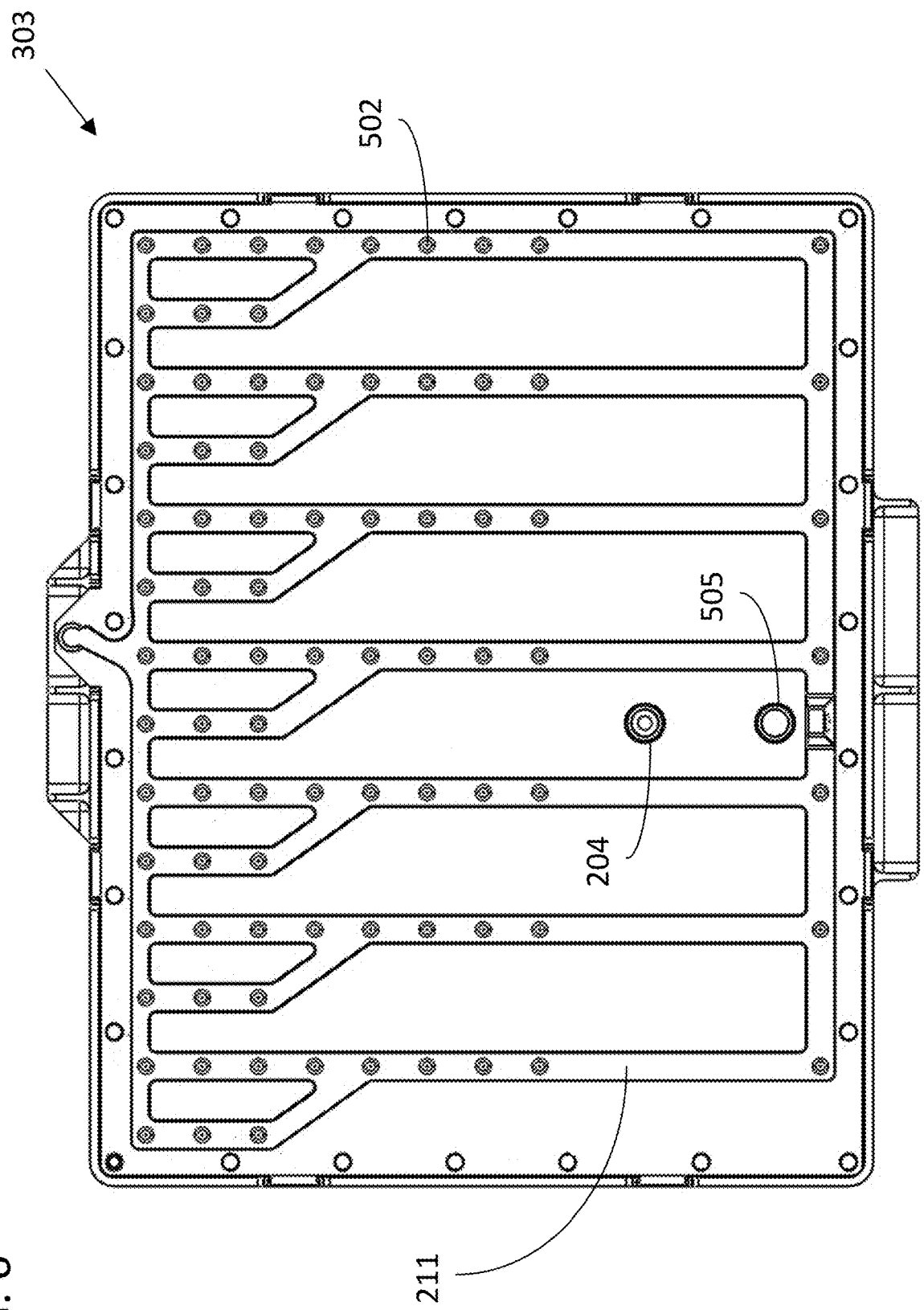
FIG. 6 illustrates a bottom view of the ingredient cartridge for the fluid mixture dispensing system, in accordance with specific embodiments disclosed herein.

In FIG. 5, fluid inlet 505 and gas inlet 204 have both been exploded to better illustrate them. However, their position relative to the bottom surface 303 of the ingredient cartridge can be different than illustrated in this figure. The fluid inlet 505 and gas inlet 204 can both be placed in an area of the bottom surface which do not interfere with the mixing channels, such as area 508. FIG. 6 illustrates a bottom view of the ingredient cartridge 105 for the fluid mixture dispensing system, in accordance with specific embodiments disclosed herein. In this view, a possible position of the fluid inlet 505 and gas inlet 204 is illustrated.

Figure 7:
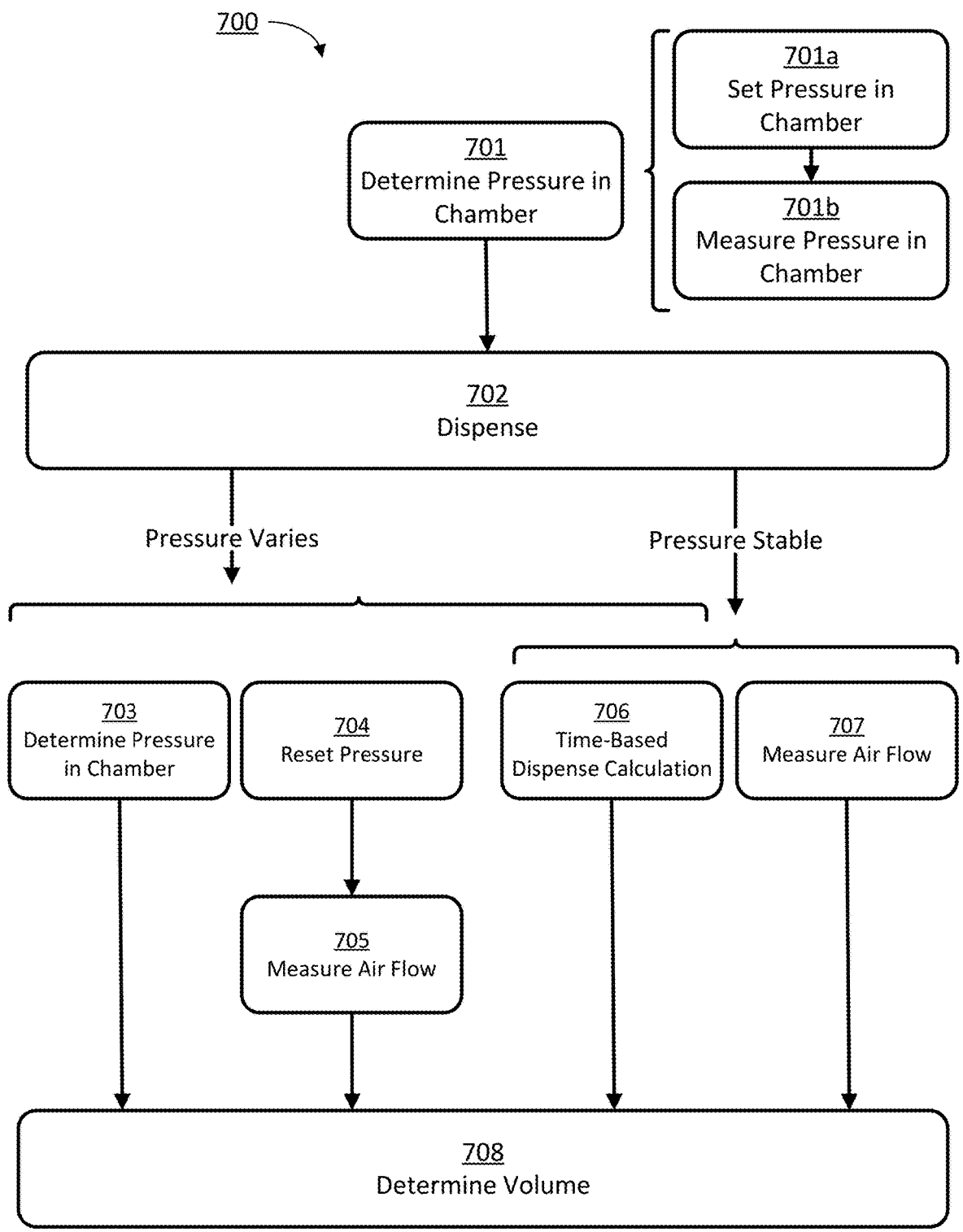
FIG. 7 illustrates a flowchart for a set of methods for the fluid mixture dispensing system, in accordance with specific embodiments disclosed herein.

In specific embodiments of the invention, the pressure in the pressurized chamber, or the amount of gas required to pressurize the chamber, can be used to determine a dispensed volume of ingredients from one or more ingredient reservoirs which are pressurized by the pressurized chamber. FIG. 7 illustrates a flowchart 700 for a set of methods for the fluid mixture dispensing system, in accordance with specific embodiments disclosed herein. Flowchart 700 includes various alternatives to determine a dispensed volume in a final step 708 based on the pressure in the chamber as determined in an initial step 701.

Flowchart 700 starts with a step 701 of determining a pressure in the chamber. Step 701 can include a step 701*a* of setting the pressure in the chamber, for example using the pneumatic system 250, a pressure regulator 225, and via the gas inlet 204. Step 701 can, alternatively or in combination, include a step 701*b* of measuring the pressure in the chamber, for example using a pressure sensor such as pressure sensor 220. The pressure determined in step 701 can be known by a controller of the system, which can perform the additional steps for determining a dispensed volume.

Flowchart 700 continues with a step 702 of dispensing at least one ingredient from the ingredient reservoirs. Step 702 can include unsealing the ingredient reservoir's orifices 215 by opening the valves 120 so that ingredient(s) can flow to the mixing area 211. As explained before in this disclosure, the pressure in the chamber (for example the pressure determined in step 701) contributes to the dispense in step 702. Step 702 can be performed consecutively or concurrently with step 701. For example, step 702 can be performed once the pressure has been determined in step 701 or while the pressure is being determined in step 701 (for example while the chamber is being pressurized to a target pressure).

The dispense can be controlled by a controller based on various factors such as the requirements for the fluid mixture to be prepared (for example a recipe or instructions for the fluid mixture). The controller can have knowledge (either locally determined or obtained from other systems) of the ingredients to be dispensed for a given fluid mixture and the valves associated to such ingredients, so that the controller knows which valve to operate to dispense such ingredients. The controller can also have knowledge of the amount of ingredient, in terms of a volume of ingredient to be dispensed or a time to let the valve open, or other factors. In any case, the dispense is carried out in step 702 so that a certain volume of one or more ingredients for a given fluid mixture are dispensed from their respective ingredient reservoirs in the pressurized chamber to the mixing area.

Step 702 is followed by four alternatives to determine a dispensed volume in step 708. In specific embodiments of the invention, when the valves are open for dispense, pressure in the pressurized chamber is allowed to vary, for example to drop due to the opening of the valves. Steps 703 and 704 refer to methods for determining a dispensed volume in those situations. In specific embodiments of the invention, the pressure in the pressurized chamber is maintained at a stable level or without significant variations during dispense. Step 707 refers to methods for determining a dispensed volume in those situations. Step 706 refers to methods that will work regardless of whether the pressure varies or is held stable.

Step 703 includes determining a second pressure in the chamber. The second pressure can be the pressure in the chamber after the dispense in step 702. As explained before, step 703 refers to a method where pressure is allowed to vary during dispense. Therefore, it is likely that the pressure measured in step 703 is different than the pressure measured in step 701. Step 703 can be performed by a pressure sensor, such as sensor 220. The sensor can be the same sensor used for step 701b. This step can also include sending the pressure measurements to a controller. The controller can then perform step 708 of determining a dispensed volume using the pressure variations given by both the pressures determined in step 701, before the dispense, and the pressure determined in step 703, after the dispense. The controller can make such determination by using calculations that involve pressure and volume as operands, such as by using the ideal gas law and equation $PV=nRT$. In specific embodiments of the invention, the calculations also consider other factors such as the time that the valves were open, the diameter of the orifices through which the volume was dispensed, the physical characteristics of the ingredients (e.g., viscosity), etc.

Step 704 includes resetting the pressure in the chamber after the dispense. As explained before, step 704 refers to a method where pressure is allowed to vary during dispense. Therefore, it is likely that the pressure determined in step 703 is different than the pressure determined in step 701. Step 703 can include the same process as in step 701. The pneumatic system can be used to repressurize the chamber via the gas inlet, and the pressure in the chamber can be monitored to guarantee that it reaches a desired level. In those embodiments, a step 705 of measuring an air flow during the reset in step 704 can be performed. Step 705 can be performed by, for example, a flow sensor in the channel from the pneumatic system to the ingredient cartridge. The air flow measurements from step 705 can then be used by a controller to determine the dispensed volume in step 708. The volume can be determined if the pressure of the volume of air is known as it is being added or by conducting a measurement on a pressure source from which the air was drawn before and after the air was added.

Step 706 includes using an empirically derived measurement to do the volume calculation in step 708. As explained before, step 706 refers to a method where pressure can be either maintained stable or varies during dispense. In either approach, a controller can have access to an empirically derived model of how much an ingredient is dispensed from an ingredient reservoir in a given amount of time under the known pressure conditions (e.g., stable pressure of a given level or decreasing pressure from a set level), and how long a specific ingredient reservoir was held open. The known pressure can be the pressure determined in step 701. The controller can then derive the volume of an ingredient dispensed using the model and measurement.

Step 707 includes measuring an air flow during dispense. This step can be conducted in a similar manner as explained by step 705. However, since step 707 refers to a method where pressure is maintained stable during dispense, instead of measuring the flow during the resetting of a pressure as in step 705, step 707 includes measuring the air flow during dispense that guarantees that the pressure in the chamber is constant during the dispense. The measurements from step 707 can be used by a controller to make the volume determinations in step 708 in the same manner as in step 705.

The volume determined in step 708 can involve a change in pressure measurement or an air flow measurement as in steps 703, 705, or 707, and can be used for various purposes. For example, the volume measurements can be used to find an error with a time-dispense based measurement and vice versa. For example, the time-dispense based measurement could be the measurement obtained in step 706. If the controller actuates the valves during a period of time to dispense an expected volume, but the volume determined in step 708 (using a measurement of a change in pressure or an air volume required to maintain pressure) does not correspond to the expected volume, this divergence can be an indicative of an error. The divergence can indicate, for example, a dispense error, such as that one of the valves is malfunctioning (e.g., a valve can be stuck and therefore not dispensing the expected volume even if actuated by the controller for the corresponding period of time). The divergence can also be an indicative of the health of the system's components, such as the pressure sensors, as the divergence in volumes can be given by an error in determining the pressure in steps 701, 703 and/or 704. The volume determination in step 708 can also be used in combination with other measurements of the system, for example time-dispense expected volume, to obtain an optimized measurement. Aside from detecting errors, a determined volume in step 708 can also be used with the determined volume in step 706 to provide a more accurate determination of the dispensed volume.

The volume determined in step 708 can also be used to adjust an open time for a valve for a next dispense cycle, or a pressure in the pressurized chamber, for example to correct for a detected error in the desired volume dispensed caused by a mechanical failure or an error in a time-dispense model. In this way, if a measured volume as determined by step 708 does not correspond to an expected volume, the opening times of the valves and/or the pressure in the chamber can be adjusted so that more/less ingredient flows to the mixing area, to make up for the dispense error. The volume determined in step 708 can also be used to control the dispensing of the ingredients. This could be used in methods that determine volume in real time as the ingredients are being dispensed. The volume determined in step 708 can then be used for these and other functions as desired. The controller can be programmed to make and use such volume determinations in the system as needed.

The volume determination in step 708 can account for the total volume dispensed from the pressurized chamber. If only one ingredient is dispensed in step 702, this volume determination could indicate the volume dispensed of that specific ingredient. In this way, if a divergence is detected as explained before, the source of the dispense error can be detected as it would be linked to that specific ingredient, ingredient reservoir and valve. However, since the pressurized chamber can include a plurality of ingredient reservoirs and more than one ingredient (from more than one ingredient reservoir) can be dispensed in step 702, this determination may not be enough to account for the dispense of a particular ingredient (from a particular ingredient reservoir). In an example where 15 ingredients are dispensed in step 702 for a given fluid mixture, a mismatch between a volume determined in step 708 and an expected volume could indicate a dispense error of any one or more of the 15 ingredients, but the system may not be able to identify which of the 15 potential sources of error is the one causing the divergence.

The methods disclosed herein can however, in specific embodiments of the invention, be used to solve for the volume dispensed of a particular ingredient among a plurality of ingredient dispensed. One way to solve for the volume of a specific ingredient would be, as mentioned before, to dispense ingredients individually, so that a single ingredient is dispensed in step 702 for the volume determination in step 708 to be associated to that single ingredient. However, dispensing ingredients individually can take a considerable amount of time in situations where a multitude of ingredients are needed for a given fluid mixture and/or where each ingredient is dispensed slowly.

In specific embodiments of the invention, the volume of a particular ingredient among a plurality dispensed in step 702 can be determined by using additional measurements and/or assumptions. For example, measurements related to the time-dispense methods can be combined with the volume determination in step 708 to solve for the individual dispensed volumes. For example, the controller can have knowledge of the dispense times (how long a valve is open to dispense an expected volume) for each valve that is open for dispense in step 702. If the expected volume based on the dispense time does not match the volume determined in step 708, an error can be inferred. For example, a dispense error could be inferred in that the discrepancy in volumes can be a result of at least one valve not dispensing the volume it is supposed to dispense according to the time it was open. As another example, during the dispense time, the valves status can be monitored. The valve status can be monitored by using additional sensors such as current sensors that measure a current draw of the valves. In this way, the measured current draw can be used together with the overall volume determination in step 708 to solve for the individual volume dispensed. This and other mechanisms are disclosed in U.S. Provisional Patent Application No. 63/146,461 filed Feb. 5, 2021, and U.S. patent application Ser. No. 17/547,716 filed Dec. 10, 2021, both of which are incorporated by reference herein in their entirety for all purposes.

In specific embodiments of the invention, the volume of a particular ingredient among a plurality of ingredients dispensed in step 702 can be determined by using multiple dispense sequences (e.g., preparing multiple different fluid mixtures) with different combinations of ingredients. A dispense error can be determined by using a common ingredient among a plurality of different ingredients, where a divergence in volume is given when that common ingredient is present in the fluid mixture. For example, if a fluid mixture comprising ingredients A and B produces a volume divergence (between an expected volume and a volume determined in step 708), a fluid mixture comprising ingredients B and C also produces a volume divergence, but a fluid mixture comprising ingredients A and C does not produce a volume divergence, it can be inferred that the dispense error is associated with ingredient B, for example that the valve for ingredient B is malfunctioning. These and other methods are possible so that the volume determination in step 708 can be used to solve for the dispensed volume of specific ingredients and/or a dispense error associated to such ingredients even when the measured pressure is shared by more than one ingredient reservoir.

A controller, as used in this disclosure for example with reference to controller 270, can include one or more processors that can be distributed locally within the system or remotely. For example, one or more components of the system, such as valves, pumps, and sensors can be associated to individual microcontrollers that can control their operations and interaction with other components of the system. In specific embodiments of the invention, the controller can be a control system for the overall device even if the various control elements are separately programmed and are not part of a common control hierarchy. The controller can have access to one or more memories that store the instructions for the controllers. The memories can also store information for the system, such as a library of recipes, reference values such as the pressure thresholds and/or target pressure values mentioned in this disclosure, and any other necessary information such as sensor data and the like.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method disclosed herein can be executed by a processor in combination with a computer readable media storing instructions for the methods in combination with the other hardware elements described above. These and other modifications and variations to the present invention may be practiced by those skilled in the art, without departing from the scope of the present invention, which is more particularly set forth in the appended claims.

What is claimed is:

1. A fluid mixture dispensing device comprising:
   a chamber;
   an inlet to the chamber;
   a set of ingredient reservoirs, in the chamber, storing a respective set of ingredients and sealed by a respective set of valves;

a pressure source; and a controller storing instructions that, when executed, cause the fluid mixture dispensing device to:

set a pressure of the chamber using the pressure source and the inlet to the chamber;

dispense, using the pressure, at least two ingredients from the respective set of ingredients by actuating at least two valves from the respective set of valves; and determine a volume dispensed during the dispense using the pressure;

wherein the chamber is air-tight when the inlet is sealed and the respective set of valves are closed.

2. The fluid mixture dispensing device of claim 1, further comprising:

an inert gas in the chamber.

3. The fluid mixture dispensing device of claim 1, wherein:

the volume dispensed is a first volume measurement; and the controller further stores instructions that, when executed, cause the fluid mixture dispensing device to:

determine a second volume measurement based on a time that a valve from the at least two valves was open during the dispense; and identify an error based on the first volume measurement and the second volume measurement.

4. The fluid mixture dispensing device of claim 1, wherein the controller further stores instructions that, when executed, cause the fluid mixture dispensing device to:

identify an error in the dispense based on the volume dispensed; and adjust an opening time for at least one of the valves in the respective set of valves to correct the error.

5. The fluid mixture dispensing device of claim 1, further comprising:

a pressure sensor;

wherein the controller further stores instructions that, when executed, cause the fluid mixture dispensing device to:

sense a pressure variation in the chamber during the dispense using the pressure sensor; and determine, using the pressure variation, the volume dispensed during the dispense.

6. The fluid mixture dispensing device of claim 1, wherein the controller further stores instructions that, when executed, cause the fluid mixture dispensing device to:

maintain, using the pressure source, the pressure in the chamber during the dispense; and determine, using the pressure, a volume dispensed of each of the at least two ingredients, based on a time that each of the at least two valves were open for the dispense.

7. The fluid mixture dispensing device of claim 1, wherein the controller further stores instructions that, when executed, cause the fluid mixture dispensing device to:

maintain, using the pressure source, the pressure in the chamber during the dispense;

measure, using a flow sensor, an air flow from the pressure source to the chamber during the dispense; and determine, using the pressure and the air flow measurement, a volume dispensed during the dispense.

8. The fluid mixture dispensing device of claim 1, wherein the controller further stores instructions that, when executed, cause the fluid mixture dispensing device to:

reset, after the dispense, the pressure in the chamber;

measure, using a flow sensor, an air flow from the pressure source to the chamber during the reset; and determine, using the air flow measurement, a volume dispensed during the dispense.

9. The fluid mixture dispensing device of claim 1, further comprising:

a pressure sensor; and a pressure regulator;

wherein the pressure of the chamber is set using both the pressure sensor and the pressure regulator.

10. A cartridge comprising:

a chamber;

an inlet to the chamber; and a set of ingredient reservoirs, in the chamber, storing a respective set of ingredients and having a respective set of orifices;

wherein the chamber is air-tight when the inlet and respective set of orifices are sealed;

wherein the cartridge is pressurized with a pressure;

wherein the respective set of orifices are configured to be sealed by a respective set of valves;

wherein the cartridge is configured to dispense, using the pressure, at least two ingredients from the respective set of ingredients through at least two valves from the respective set of valves;

wherein the respective set of valves are actuated by a controller; and wherein the controller is programmed to determine a volume dispensed during the dispense using the pressure.

11. The cartridge of claim 10, further comprising:

a membrane covering the set of ingredient reservoirs;

wherein the respective set of ingredients are stored as concentrated liquids; and wherein the membrane is permeable to gas and impermeable to liquids.

12. The cartridge of claim 10, further comprising:

a membrane covering the set of ingredient reservoirs;

wherein the membrane has a first layer and a second layer;

wherein the first layer and the second layer have a respective first set of slits and a respective second set of slits; and wherein the slits in the respective first set of slits are misaligned with the slits in the respective second set of slits.

13. The cartridge of claim 10, further comprising:

a membrane covering the set of ingredient reservoirs;

wherein the membrane has a first layer and a second layer;

wherein the first layer is attached to at least a portion of the set of ingredient reservoirs via a first adhesive; and wherein the first layer and the second layer are attached via a second adhesive.

14. The cartridge of claim 10, further comprising:

an inert gas in the chamber.

15. The cartridge of claim 10, wherein:

the volume dispensed is a first volume measurement; and the controller is further programmed to:

determine a second volume measurement based on a time that a valve from the at least two valves was open during the dispense; and identify an error based on the first volume measurement and the second volume measurement.

16. The cartridge of claim 10, wherein the controller is further programmed to:

identify an error in the dispense based on the volume dispensed; and adjust an opening time for at least one of the valves in the respective set of valves to correct the error.

17. The cartridge of claim 10, further comprising:
a pressure sensor configured to: (i) sense a pressure variation in the chamber; and (ii) communicate with a controller; and
wherein the controller stores instructions to determine, using the pressure variation, the volume dispensed during the dispense.

18. The cartridge of claim 10, wherein:
the cartridge is installed on a device;
the cartridge is pressurized, by a pressure source via the inlet to the chamber, with a pressure;
the respective set of orifices are sealed by a respective set of valves; and
each ingredient from the set of ingredient reservoirs is dispensed when a respective valve in the respective set of valves is open.

19. The cartridge of claim 18, wherein:
the pressure source maintains the pressure in the chamber during the dispense.

20. The cartridge of claim 18, wherein:
a volume dispensed of each ingredient in the set of ingredient reservoirs depends on a time that each valve in the respective set of valves were open for the dispense.

21. The cartridge of claim 18, further comprising:
a flow sensor to measure an air flow from the pressure source to the chamber during the dispense;
wherein a volume dispensed depends on the pressure and the air flow measurement.

22. The cartridge of claim 18, further comprising:
a flow sensor to measure an air flow from the pressure source to the chamber;
wherein the pressure in the chamber is reset after the dispense; and
wherein the volume dispensed is determined based on an air flow measurement during the reset.

23. A method comprising:
determining a first pressure in a chamber using a pressure sensor, wherein the chamber includes an inlet to the chamber and at least two ingredient reservoirs, and wherein the at least two ingredient reservoirs store a respective set of at least two ingredients and are sealed by at least two valves from a respective set of valves;
subsequent to the determining, dispensing at least two respective ingredients from the at least two ingredient reservoirs by actuating at least two valves from the respective set of valves, wherein the chamber is air-tight when the inlet is sealed and the respective set of valves are closed;
subsequent to the dispensing, determining a second pressure in the chamber using the pressure sensor; and
determining a volume dispensed from the at least two ingredient reservoirs using a difference between the first pressure and the second pressure.

24. The method of claim 23, wherein determining the first pressure in the chamber includes at least one of:
setting the pressure in the chamber; and
measuring the pressure in the chamber.

25. A fluid mixture dispensing device comprising:
a chamber;
an inlet to the chamber;
a set of ingredient reservoirs, in the chamber, storing a respective set of ingredients and sealed by a respective set of valves;
a pressure source;
a membrane covering the set of ingredient reservoirs;
wherein the respective set of ingredients are stored as concentrated liquids;
wherein the membrane is permeable to gas and impermeable to liquids;
wherein the chamber is air-tight when the inlet is sealed and the respective set of valves are closed; and
a controller storing instructions that, when executed, cause the fluid mixture dispensing device to:
set a pressure of the chamber using the pressure source and the inlet to the chamber; and
dispense, using the pressure, at least two ingredients from the respective set of ingredients by actuating at least two valves from the respective set of valves.

26. A fluid mixture dispensing device comprising:
a chamber;
an inlet to the chamber;
a set of ingredient reservoirs, in the chamber, storing a respective set of ingredients and sealed by a respective set of valves;
a pressure source;
a membrane covering the set of ingredient reservoirs;
wherein the membrane has a first layer and a second layer;
wherein the first layer and the second layer have a respective first set of slits and a respective second set of slits;
wherein the slits in the respective first set of slits are misaligned with the slits in the respective second set of slits;
wherein the chamber is air-tight when the inlet is sealed and the respective set of valves are closed; and
a controller storing instructions that, when executed, cause the fluid mixture dispensing device to:
set a pressure of the chamber using the pressure source and the inlet to the chamber; and
dispense, using the pressure, at least two ingredients from the respective set of ingredients by actuating at least two valves from the respective set of valves.

27. A fluid mixture dispensing device comprising:
a chamber;
an inlet to the chamber;
a set of ingredient reservoirs, in the chamber, storing a respective set of ingredients and sealed by a respective set of valves;
a pressure source;
a membrane covering the set of ingredient reservoirs;
wherein the chamber is air-tight when the inlet is sealed and the respective set of valves are closed;
wherein the membrane has a first layer and a second layer;
wherein the first layer is attached to at least a portion of the set of ingredient reservoirs via a first adhesive;
wherein the first layer and the second layer are attached via a second adhesive; and
a controller storing instructions that, when executed, cause the fluid mixture dispensing device to:
set a pressure of the chamber using the pressure source and the inlet to the chamber; and
dispense, using the pressure, at least two ingredients from the respective set of ingredients by actuating at least two valves from the respective set of valves.

28. A fluid mixture dispensing device comprising:
a chamber;
an inlet to the chamber;
a set of ingredient reservoirs, in the chamber, storing a respective set of ingredients and sealed by a respective set of valves;
a pressure source;
a membrane covering the set of ingredient reservoirs;

wherein the chamber is air-tight when the inlet is sealed and the respective set of valves are closed; and
a controller storing instructions that, when executed, cause the fluid mixture dispensing device to:
set a pressure of the chamber using the pressure source and the inlet to the chamber; and
dispense, using the pressure, at least two ingredients from the respective set of ingredients by actuating at least two valves from the respective set of valves;
reset, after the dispense, the pressure in the chamber;
measure, using a flow sensor, an air flow from the pressure source to the chamber during the reset; and
determine, using the air flow measurement, a volume dispensed during the dispense.

29. A fluid mixture dispensing device comprising:
a chamber;
an inlet to the chamber;
a set of ingredient reservoirs, in the chamber, storing a respective set of ingredients and sealed by a respective set of valves;
a pressure source;
a pressure sensor;
a pressure regulator
wherein the chamber is air-tight when the inlet is sealed and the respective set of valves are closed; and
a controller storing instructions that, when executed, cause the fluid mixture dispensing device to:
set a pressure of the chamber using the pressure source and the inlet to the chamber, wherein the pressure of the chamber is set using both the pressure sensor and the pressure regulator; and
dispense, using the pressure, at least two ingredients from the respective set of ingredients by actuating at least two valves from the respective set of valves.

30. A cartridge comprising:
a chamber;
an inlet to the chamber;
a set of ingredient reservoirs, in the chamber, storing a respective set of ingredients and having a respective set of orifices; and
a membrane covering the set of ingredient reservoirs;
wherein the chamber is air-tight when the inlet and respective set of orifices are sealed;
wherein the respective set of ingredients are stored as concentrated liquids; and
wherein the membrane is permeable to gas and impermeable to liquids.

31. A cartridge comprising:
a chamber;
an inlet to the chamber;
a set of ingredient reservoirs, in the chamber, storing a respective set of ingredients and having a respective set of orifices; and
a membrane covering the set of ingredient reservoirs;
wherein the chamber is air-tight when the inlet and respective set of orifices are sealed; wherein the membrane has a first layer and a second layer
wherein the first layer and the second layer have a respective first set of slits and a respective second set of slits; and
wherein the slits in the respective first set of slits are misaligned with the slits in the respective second set of slits.

32. A cartridge comprising:
a chamber;
an inlet to the chamber; and
a set of ingredient reservoirs, in the chamber, storing a respective set of ingredients and having a respective set of orifices; and
a membrane covering the set of ingredient reservoirs;
wherein the chamber is air-tight when the inlet and respective set of orifices are sealed;
wherein the membrane has a first layer and a second layer;
wherein the first layer is attached to at least a portion of the set of ingredient reservoirs via a first adhesive; and
wherein the first layer and the second layer are attached via a second adhesive.

* * * * *